United States Patent
Horii

(10) Patent No.: US 7,389,441 B2
(45) Date of Patent: Jun. 17, 2008

(54) APPARATUS AND METHOD FOR CONTROLLING ELECTRONIC DEVICE

(75) Inventor: Hirofumi Horii, Asaka (JP)

(73) Assignee: Fujifilm Corporation, Tokyo (JP)

(*) Notice: Subject to any disclaimer, the term of this patent is extended or adjusted under 35 U.S.C. 154(b) by 505 days.

(21) Appl. No.: 11/190,998

(22) Filed: Jul. 28, 2005

(65) Prior Publication Data

US 2006/0026448 A1   Feb. 2, 2006

(30) Foreign Application Priority Data

Jul. 29, 2004  (JP) ............................. 2004-221302
May 20, 2005  (JP) ............................. 2005-147454

(51) Int. Cl.
  *G06F 1/30* (2006.01)
(52) U.S. Cl. ........................ 713/340; 713/300
(58) Field of Classification Search ................ 713/300, 713/310, 320, 324, 330, 340
See application file for complete search history.

(56) References Cited

U.S. PATENT DOCUMENTS 5,832,324 A * 11/1998 Shimizu et al. ............. 396/303
6,339,264 B1 * 1/2002 Wang ...................... 307/132 E
2002/0154243 A1 * 10/2002 Fife et al. ................... 348/372
2003/0076438 A1 * 4/2003 Ishimaru ..................... 348/372

FOREIGN PATENT DOCUMENTS

JP     10-105296    4/1998
JP     2002-373037  12/2002

* cited by examiner

*Primary Examiner*—Dennis M Butler
(74) *Attorney, Agent, or Firm*—McGinn IP Law Group, PLLC

(57) ABSTRACT

If an image sensing lens is retracted into a camera body when the voltage of the camera battery is low, the battery voltage will fall below a prescribed value. The lens retracting operation, therefore, is brought to a rapid halt in such case. Owing to the rapid halt, the battery voltage rises above the prescribed value. The retraction of the lens is then performed slowly. The slowed retraction of the lens makes it possible to prevent the battery voltage from falling too suddenly. Since the battery voltage will not drop even through the retracting operation is resumed, it is possible to prevent the retracting operation from being rapidly halted again owing to a drop in battery voltage.

9 Claims, 8 Drawing Sheets

APPARATUS AND METHOD FOR CONTROLLING ELECTRONIC DEVICE

BACKGROUND OF THE INVENTION

1. Field of the Invention

This invention relates to an apparatus and method for controlling an electronic device.

2. Description of the Related Art

Some electronic devices are operated by power supplied from a battery. Since such an electronic device naturally will cease operating when the battery is consumed, it has been proposed to monitor whether the voltage of the battery has fallen below a predetermined threshold-value voltage and halt operation beforehand in response to the battery voltage falling below the threshold-value voltage (see the specification of Japanese Patent Application Laid-Open No. 10-105296).

Since the operating voltage of the electronic device rises owing to the halting of its operation, operation of the device can be started again. When the electronic device is started again, however, the operating voltage of the device declines again and falls below the predetermined threshold-value voltage and operation stops again. Thus, there are instances where operation stop and start are repeated. It has been proposed to prevent the repetition of operation stop and start by so arranging it that the device will not start again if operation of the device has ceased (see the specification of Japanese Patent Application Laid-Open No. 2002-373037).

A problem with the above-cited proposal, however, is that once operation ceases, the device will remain in the state it was in at cessation of operation.

SUMMARY OF THE INVENTION

Accordingly, an object of the present invention is to so arrange it that if operation of an electronic device has stopped, the device can be made to complete the operation without operation stop and stop being repeated.

According to the present invention, the foregoing object is attained by providing an apparatus for controlling an electronic device, the apparatus comprising: a power supply circuit for supplying each circuit of the electronic device with electric power provided by a battery removably installed in the electronic device; a first detection circuit for detecting whether voltage of the battery is less than a first threshold-value voltage, or equal to or greater than the first threshold-value voltage; a first power supply control device, responsive to detection of a power drop by the first detection circuit indicating that the voltage of the battery is less than the first threshold-value voltage, for controlling the power supply circuit so as to halt supply of electric power to a circuit that was operating when the power drop was detected; and a second power supply control device, responsive to halting of supply of electric power by the first power supply control device, for controlling the power supply circuit so as to supply the circuit that was operating when the power drop was detected with electric power (power, voltage, current) that is lower than electric power that was being supplied when the power drop was detected.

The present invention also provides a control method suited to the above-described apparatus for controlling an electronic device. Specifically, the present invention provides a method of controlling an electronic device having a power supply circuit for supplying each circuit of the electronic device with electric power provided by a removably installed battery, the method comprising the steps of: detecting whether voltage of the battery is less than a first threshold-value voltage, or equal to or greater than the first threshold-value voltage; in response to detection of a power drop indicating that the voltage of the battery is less than the first threshold-value voltage, halting supply of electric power to a circuit that was operating when the power drop was detected; and in response to halting of supply of electric power, supplying electric power to the circuit that was operating when the power drop was detected with electric power that is lower than power that was being supplied when the power drop was detected.

According to the present invention, each circuit of an electronic device is supplied with electric power provided by a battery removably installed in the device. Whether the battery voltage is less than a first threshold-value voltage or equal to or greater than the first threshold-value voltage is detected. If a power drop, which indicates that the battery voltage is less than the first threshold-value voltage, is detected, then the supply of electric power to a circuit that was operating when the power drop was detected is halted. This is followed by supplying the circuit that was operating when power dropped with electric power that is lower than the electric power that was being supplied when the power drop was detected. Since a low electric power is thus supplied, the battery voltage will not suddenly fall to a value below the threshold value. The circuit supplied with the low electric power is capable of completing the operation that was being performed when the power drop was detected.

The apparatus may further comprise an operation-completion determination device for determining whether operation has been completed in response to supply of the lower power from the power supply circuit based upon the second power supply control device; and a first notification device, responsive to a determination by the operation-completion determination device that the operation has been completed, for giving notification of the fact that there is little battery capacity left.

Since the user is notified of the fact that there is little battery capacity left, the user can ascertain the reason for halting of operation and can replace the battery as necessary.

The apparatus may further comprise a third power supply control device, responsive to notification by the first notification device, for controlling the power supply circuit so as to turn off the power supply.

The power supply circuit may be one that is capable of supplying each circuit of the electronic device with electric power applied to an external power supply terminal besides electric power provided from the battery. In this case, the apparatus would further comprise a detection device for detecting whether the external power supply terminal exists; and a first notification control device, responsive to detection by the detection device that an external power supply terminal exists, for controlling the first notification device so as to halt notification by the first notification device.

In a case where the electronic device operates based upon power applied to an external power supply terminal, notification of little residual battery capacity may be given regardless of the fact that the device is capable of operation. This would provide the user with erroneous information. Notification of the fact that there is little battery capacity left is halted for this reason.

The apparatus may further comprise a timer for measuring battery voltage drop time extending from halt of supply of power based upon the first power supply control device to start of supply of power based upon the second power supply control device; a time determination device for determining whether the battery voltage drop time measured by the timer is equal to or greater than a fixed time; a second notification control device, responsive to a determination by the time determination device that the battery voltage drop time is equal to or greater than the fixed time, for controlling the notification device so as to halt notification by the notification device.

If the battery voltage drop time is equal to or greater than the fixed time, it can be construed that the old battery has been replaced by a new battery. Notification of the fact that there is little battery capacity left is halted for this reason.

The apparatus may further comprise a repetition count determination device for determining whether control for halting supply of electric power based upon the first power supply control device and start of supply of lower power based upon the second power supply control device have been repeated a prescribed number of times; a second notification device, responsive to a determination by the repetition count determination device that repetition has been performed the prescribed number of times, for giving notification of the fact that there is little battery capacity left; and a fourth power supply control device, responsive to notification by the second notification device, for controlling the power supply circuit so as to turn off the power supply.

The apparatus may further comprise a second detection circuit, which operates in response to the power supply of the electronic device being turned off and has a detection accuracy lower than that of the first detection circuit, for detecting whether the voltage of the battery has become smaller than a second threshold value; a first detection halting device for halting detection operation by the first detection circuit in response to the power supply of the electronic device being turned off; and a detection-circuit control device, responsive to detection by the second detection circuit that the voltage of the battery is smaller than the second threshold value, for controlling the first detection circuit and the second detection circuit so as to halt the detection operation by the second detection circuit and start the detection operation by the first detection circuit.

If a plurality of circuits were operating when the power drop was detected, said first power supply control device halts supply of electronic power to the plurality of circuits that were operating. In this case, the second power supply control device would supply electric power that is lower than the electric power that was being supplied at detection of the power drop to that circuit which started operating immediately before detection of the power drop among the plurality of circuits whose operation was halted by the operation halting control device.

Among the plurality of circuits, circuits other than the circuit that started operating immediately before detection of the power drop need not be supplied with power lower than the power that was being supply when the voltage drop was detected. This makes it possible to suppress consumption of power.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
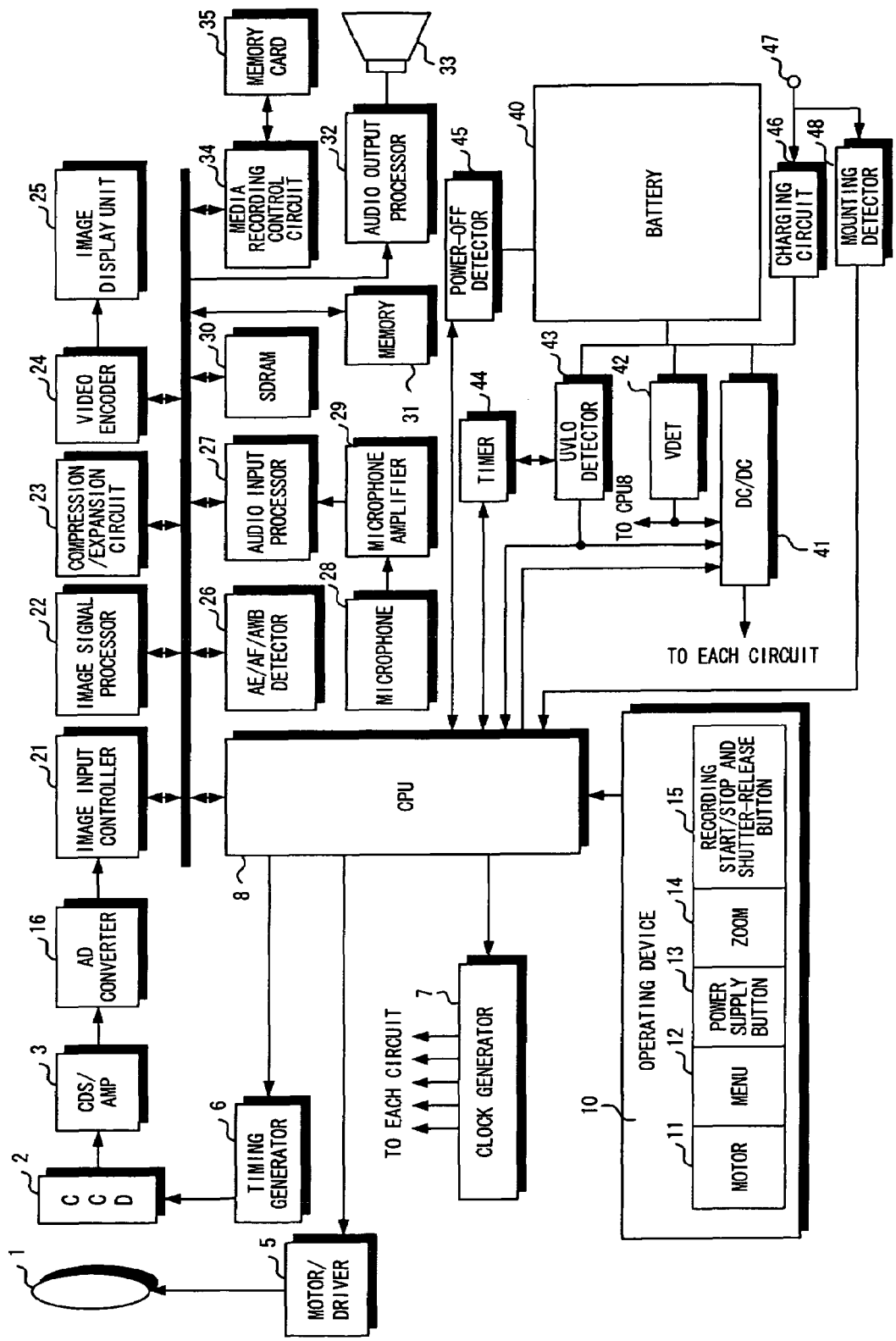
FIG. 1 is a block diagram illustrating the electrical structure of a digital still camera.

FIG. 1 is a block diagram illustrating the electrical structure of a digital still camera according to a preferred embodiment of the invention.

The overall operation of the digital still camera is controlled by a CPU 8.

A clock generator 7 is connected to the CPU 8. Clock pulses are generated by the clock generator 7 and supplied to each of the circuits constituting the digital still camera.

The digital still camera is equipped with an operating device 10. The latter includes a mode setting switch 11 (for setting modes such as an image recording mode, image playback mode, voice recording mode and voice playback mode), a menu switch 12, a power supply button 13, a zoom button 14 and a recording start/stop and shutter-release button 15. An operating signal that is output from the operating device 10 is applied to the CPU 8.

The digital still camera according to this embodiment is capable of being operated by a removable battery 40. Connected to the battery 40 are a VDET (V-detect) circuit 42 for detecting whether the voltage of the battery 40 is equal to or greater than a prescribed voltage, a UVLO (under-voltage lock-out) detection circuit 43 and a power-supply OFF detecting circuit 45.

The VDET circuit 42 and UVLO detection circuit 43 are both circuits used to limit the operation of the digital still camera in a case where the voltage of the battery 40 has dropped suddenly. Output signals from the VDET circuit 42 and UVLO detection circuit 43 are applied to both a DC/DC converter 41 and to the CPU 8. The VDET circuit 42 has a lower detection accuracy than that of the UVLO detection circuit 43 but consumes less electric power. Conversely, the UVLO detection circuit 43 has a higher detection accuracy than that of the VDET circuit 42 but consumes more electric power. The digital still camera according to this embodiment is such that highly accurate detection is performed by the UVLO detection circuit 43 while the power supply of the digital still camera is on, whereas detection by the VDET circuit 42 is carried out while the power supply is off. As a result, power consumption can be suppressed while the power supply is off. A threshold value used in VDET circuit 42 and a threshold value used in UVLO detection circuit 43 are approximately equal. A timer 44 is connected to the VDET circuit 42. The timer 44 measures the length of time during which the voltage of battery 40 detected by UVLO detection circuit 43 is below the threshold value. Data representing the measured time is applied to the CPU 8.

A power-off detection circuit 45 detects whether the voltage of battery 40 has fallen below a predetermined threshold value (a value higher than the threshold value used in the VDET circuit 42 and UVLO detection circuit 43). (If the voltage of battery 40 drops suddenly, this is detected by the UVLO detection circuit 43 before detection is performed by the power-off detection circuit 45.) If the power-off detection circuit 45 detects that the voltage of battery 45 has fallen below the predetermined threshold value, then the fact that battery capacity no longer remains is displayed and a prescribed power-off sequence is executed, as will be described later.

The output voltage of the battery 40 is applied to the DC/DC converter 41, the output voltage of which is supplied to each circuit of the digital still camera as operating voltage (operating power).

The digital still camera according to this embodiment can also be operated using an AC power source. To accomplish this, the digital still camera is provided with a jack 47. The digital still camera can be made to operate using an AC power source by connecting an AC outlet cord, which has been provided with an AC/DC converter, to the jack 47. A charging circuit 46 is connected to the jack 47 so that the battery 40 will be charged based upon the AC power source connected to the jack 47. A mounting detection circuit 48 is further connected to the jack 47 and detects the fact that the AC outlet cord has been connected to jack 47. The detection signal from the mounting detection circuit 48 is applied to the CPU 8.

The digital still camera includes an image sensing lens 1. The latter is positioned by a motor/driver 5 controlled by the CPU 8. Light condensed by the image sensing lens 1 forms an image on the photoreceptor surface of a CCD 2. If the image recording mode has been set by the mode setting button 11, then a video signal representing the image of a subject is output from the CCD 2 driven by a timing generator 6.

The video signal that has been output from the CCD 2 is subjected to correlated double sampling (CDS) by a CDS amplifier circuit 3. The resultant signal is applied to an analog/digital converting circuit 4, which converts the video signal to digital image data. The digital image data obtained by the conversion is input to an AE (automatic exposure)/AF (autofocus)/AWB (automatic white balance) detection circuit 26 via an image input controller 21. AE data and AF data is generated in the AE/AF/AWB detection circuit 26 and the generated data is input to the CPU 8. An automatic exposure adjustment such as adjustment of the shutter time of the CCD 2 and autofocus processing such as positioning of the image sensing lens 1 at the focal point are carried out under the control of the CPU 8. The AE/AF/AWB detection circuit 26 also executes processing for automatic white balance adjustment.

Image data obtained by the conversion in the analog/digital converting circuit 4 is subjected to prescribed signal processing such as a gamma correction in an image signal processing circuit 22 via the image input controller 21. Image data that has been output from the image signal processing circuit 22 is applied to and stored temporarily in an SDRAM 30. The image data is read out of the SDRAM 30, encoded by a video encoder 24 and applied to an image display unit 25. The image of the subject obtained by image sensing is displayed on the display screen of the image display unit 25.

If the recording start/stop and shutter-release button 15 is pressed, the image data read out of the SDRAM 30 as mentioned above is applied to a compression/expansion circuit 23. Compression of the image data is performed in the compression/expansion circuit 23 in the order of input, and the compressed image data is stored in a memory 31 in order. When image data representing one frame of an image is entirely compressed and stored in the memory 31, this one frame of image data is read out of the memory 31 and the data is then stored on a memory card 35 by a media recording control circuit 34.

If the image playback mode is set, image data that has been recorded on the memory card 35 is read out by the media recording control circuit 34 and applied to the compression/expansion circuit 23. Image data that has been compressed is expanded in the compression/expansion circuit 23. The expanded image data is applied to and stored in the memory 31 successively. The expanded image data is applied to the video encoder 24 from the memory 31, whereby an image represented by the image data that has been read out of the memory card 35 is displayed on the image display unit 25.

If the voice recording mode is set, voice that has been entered from a microphone 28 is converted to a voice signal and the voice signal is applied to a microphone amplifier circuit 29. The voice signal is amplified by the microphone amplifier circuit 29 and is subjected to prescribed audio input processing such as an analog/digital conversion in an audio input processing circuit 27. Audio data that is output from the audio input processing circuit 27 is applied to the memory card 35 by the media recording control circuit 34.

If the voice playback mode is set, audio data that has been recorded on the memory card 35 is read out and applied to an audio output processing circuit 32 by the media recording control circuit 34. Prescribed audio output processing such as a digital/analog conversion is executed in the audio output processing circuit 32 and the resultant data is applied to a speaker 33. The latter outputs voice represented by the audio data that has been recorded on the memory card 35.

Figure 2:
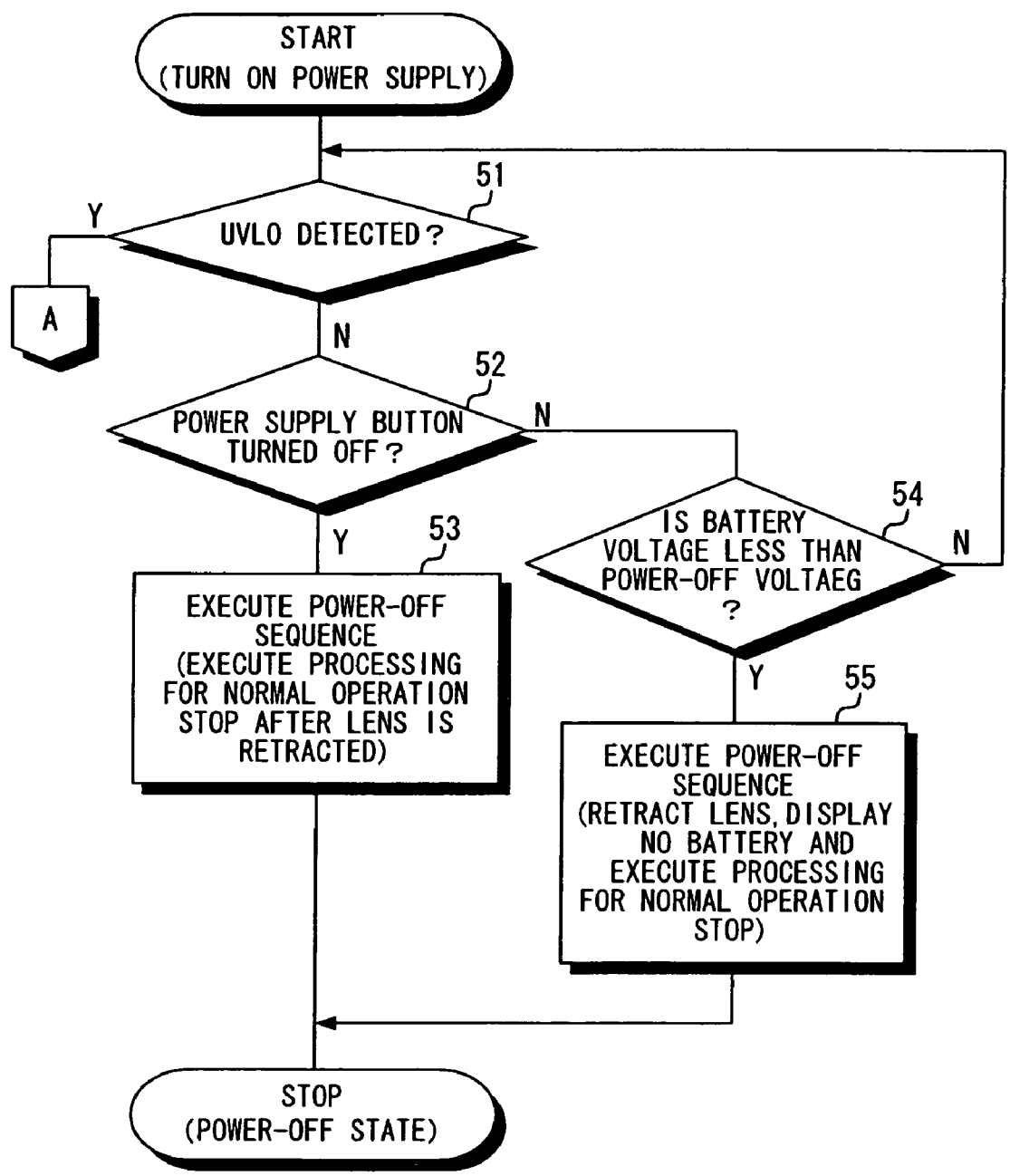
FIGS. 2 to 8 are flowcharts illustrating part of the processing procedure of the digital still camera.
Figure 3:
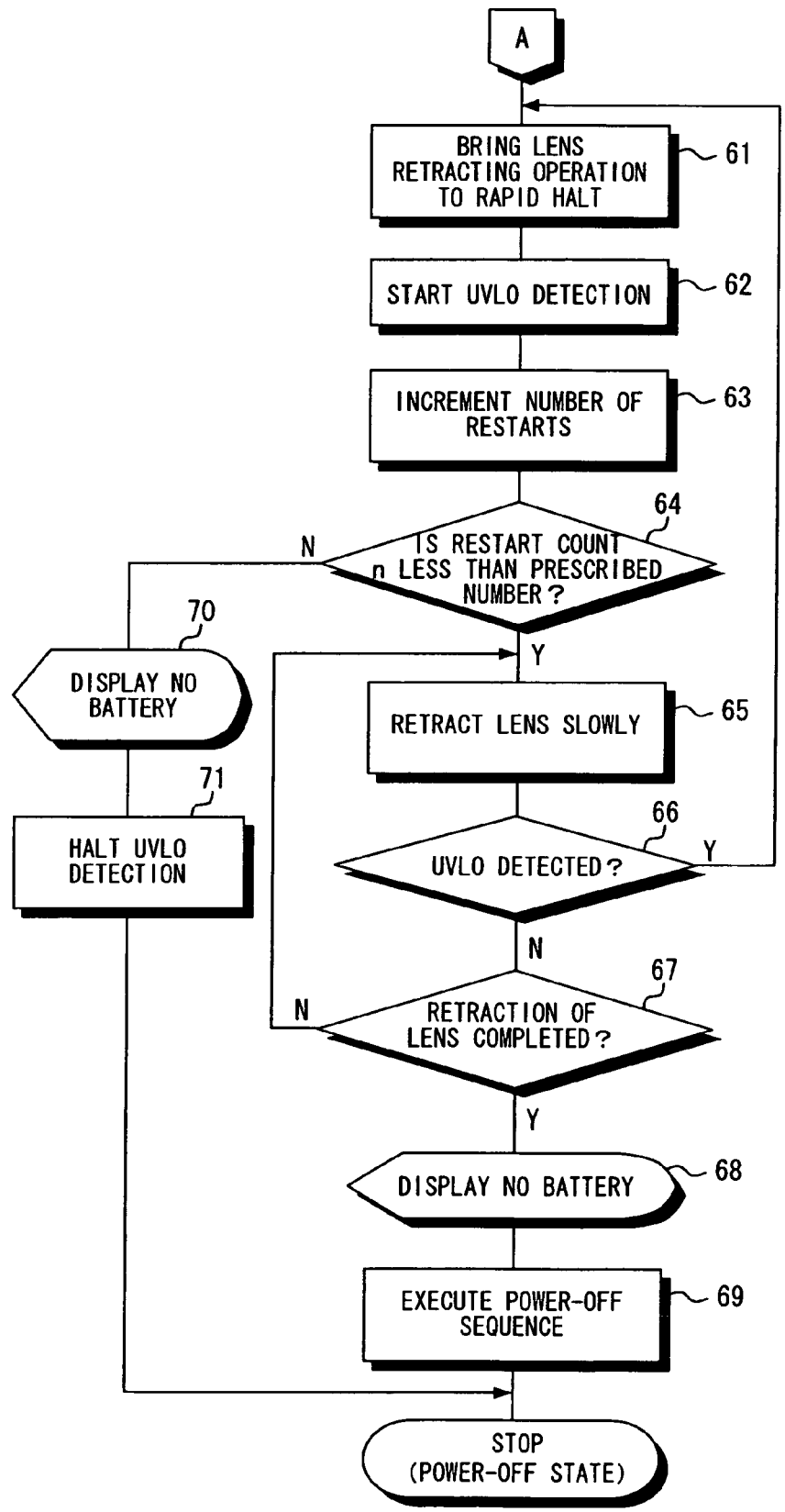

FIGS. 2 and 3 are flowcharts showing processing executed by the digital still camera. This is primarily processing for controlling the power supply.

In the processing illustrated below, an operation of some kind is performed in a case where the power supply of the digital still camera is on (in this embodiment, it is assumed that the operation is an operation to retract or collapse the image sensing lens 1 into the camera body, although it goes without saying that other operations are possible as well). When the UVLO detection circuit 43 detects that the voltage of battery 40 has fallen below UVLO (a first threshold value) (referred to as "UVLO detection") as a result of this operation, supply of electric power (power, voltage) from the DC/DC converter 41 to the operating circuit is halted and operation is brought to a rapid stop. Owing to halting of the supply of electric power, battery voltage surpasses UVLO. As a result, electric power lower than the electric power that was being supplied prior to halting of operation is supplied from the DC/DC converter 41 to the circuit whose operation was halted, and the rapid-halt operation is made to start off slowly. The power supply of the digital still camera is subsequently turned off. Since the circuit whose operation was brought to a rapid halt is supplied with low electric power so that the circuit may operate slowly, a sudden drop in battery voltage can be prevented. Further, even though low power is supplied and operation proceeds slowly, UVLO detection may occur again. In this embodiment, therefore, the number of times UVLO detection occurs is counted and UVLO detection is halted if the count exceeds a predetermined number. This makes it possible to prevent repetitive start and stop of operation caused by turning the power supply on and off repeatedly.

In a case where the power supply of the digital still camera has been turned on, monitoring is performed to determine whether UVLO has been detected (step 51). UVLO is detected when processing involving a heavy load, such as processing for collapsing the image sensing lens 1, is executed in a case where there is little battery voltage.

If UVLO has not been detected ("NO" at step 51), then it is determined whether the power supply button 13 has been turned off (step 52). If the power supply button 13 has been turned off ("YES" at step 52), then a prescribed power-off sequence is executed (step 53). For example, if the image sensing lens 1 is in the projected state, processing to retract the image sensing lens 1 into the camera body is executed. If the power supply button 13 has been turned on ("NO" at step 52), then the power-off detection circuit 45 detects whether the voltage of battery 40 has fallen below a power-off voltage (the power-off voltage is higher than the UVLO-detection voltage detected in the UVLO detection circuit 43) (step 54). If the voltage of battery 40 falls below the power-off voltage ("YES" at step 54), the prescribed power-off sequence is executed (step 55). In this case, the fact that there is no longer battery available (i.e., that there is little battery capacity left) is displayed on the display screen of the image display unit 25 because the voltage of the battery 40 has declined (step 55). If the voltage of battery 40 is not below the power-off voltage ("NO" at step 54), the processing of steps 51 to 54 is executed.

If an operation requiring a large amount of voltage is performed, as when processing for retracting the image sensing lens 1 is executed, under conditions in which the voltage of battery 40 is low, UVLO is detected ("YES" at step 51), supply of voltage to the operating circuit is halted and the operation currently in progress is brought to a rapid halt (step 61). For example, if UVLO is detected when processing for retracting the image sensing lens 1 has been executed, supply of voltage from the DC/DC converter 41 to the motor/driver 5, which executes the processing for retracting the image sensing lens 1, is halted. By bringing the operation currently in progress to a rapid halt, the load is alleviated and the voltage of battery 40 rises above UVLO as a result. Processing for detecting UVLO in the UVLO detection circuit 43 resumes (step 62). When this occurs, the number of restarts is incremented (step 63).

In this embodiment, there is a limit upon the number of restarts, as mentioned above. If the number of restarts is less than a prescribed number ("YES" at step 64), therefore, then the DC/DC converter 41 supplies the motor/driver 5 with electric power lower than the electric power that was being supplied when UVLO was detected. The retracting operation of the image sensing lens 1 is slowly carried out (step 65). Since the motor/driver 5 is supplied with low electric power and the retracting operation is performed slowly, a sudden drop in the voltage of the battery 40 can be suppressed. It is possible to prevent a situation in which UVLO detection occurs again and retraction of the image sensing lens 1 suddenly stops.

If UVLO detection does not occur in the operation for retracting the image sensing lens 1 slowly ("NO" at step 66), then the processing of steps 65 and 66 is repeated until the retracting operation ends (step 67). When the retracting operation ends ("YES" at step 67), the voltage of battery 40 will have dropped and therefore the fact that there is no longer battery available is displayed on the display screen of the image display unit 25 (step 68). The prescribed power-off sequence is executed thereafter (step 69). If UVLO detection occurs in the operation for retracting the image sensing lens 1 slowly ("YES" at step 66), then the retracting operation is brought to a rapid stop again (step 61) and the number of restarts is incremented (step 63).

If the number of restarts exceeds the prescribed number ("NO" at step 64), the fact that there is no longer battery available is displayed on the display screen of the image display unit 25 (step 70). Further, the prescribed number is exceeded and the UVLO detection processing in UVLO detection circuit 43 is halted in order to prevent repetition of rapid halt and restart of operation (step 71).

Figure 4:
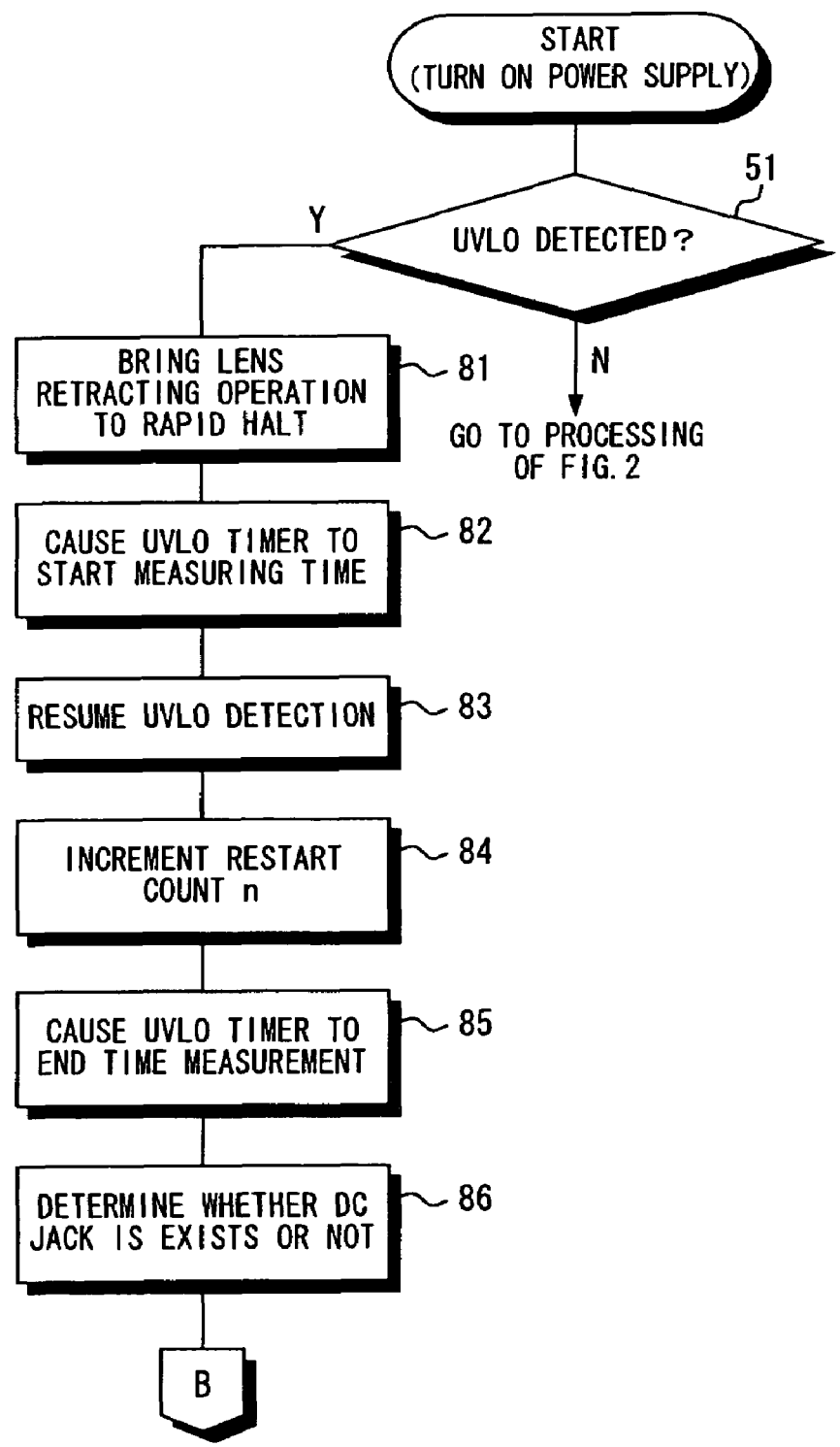
Figure 5:
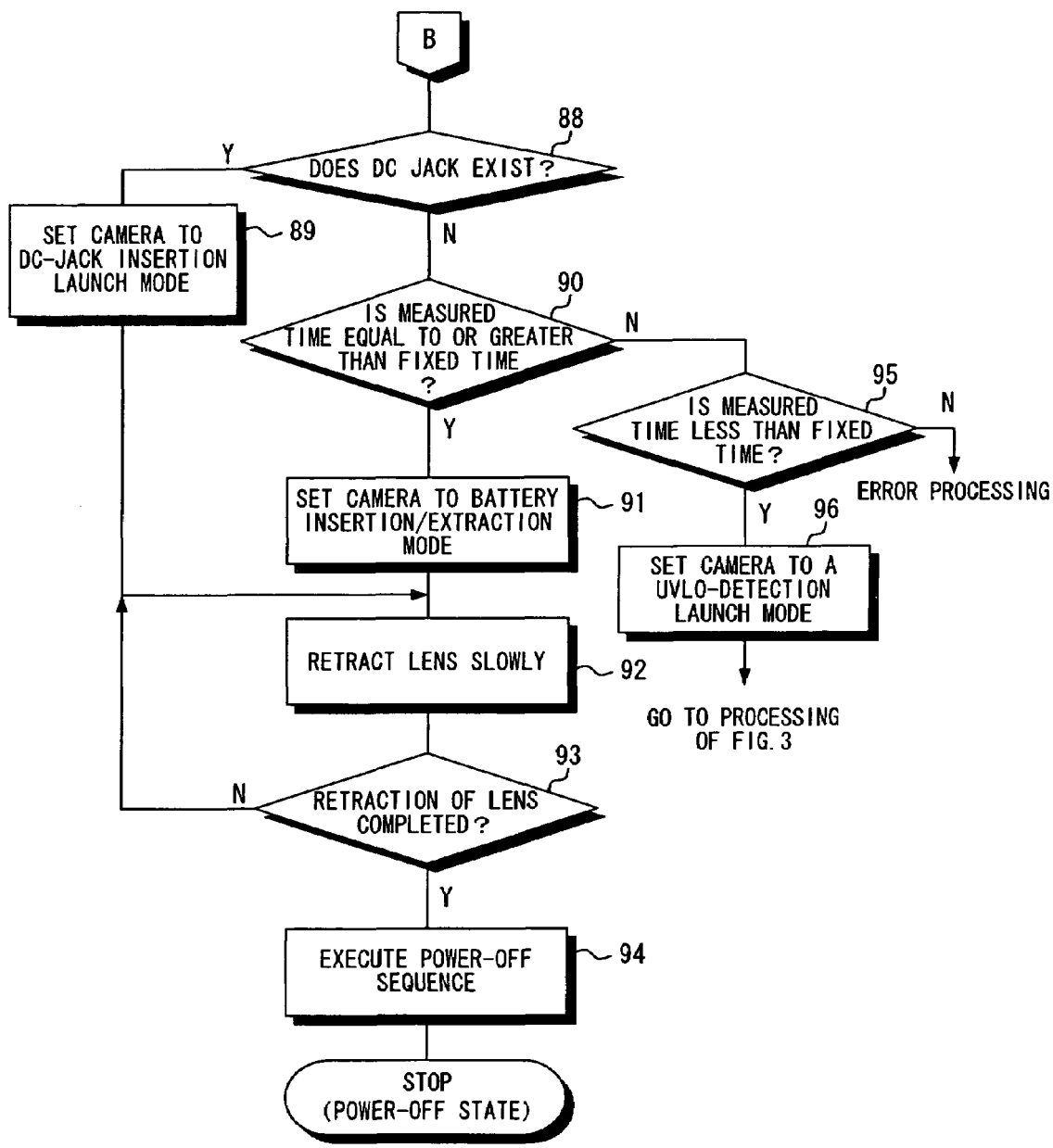

FIGS. 4 and 5 are flowcharts illustrating processing executed by a digital still camera according to another embodiment of the present invention. These flowcharts correspond to FIGS. 2 and 3.

In the processing set forth below, the processing changes based upon the time during which operation is brought to a rapid halt in accordance with detection of jack 47 and detection of UVLO.

If UVLO detection does not occur in a case where the power supply is on, then processing identical with that shown in FIGS. 2 and 3 is executed.

If UVLO detection occurs in a case where the power supply is on ("YES" at step 51), then the lens retracting operation is brought to a rapid halt (step 81) and the UVLO timer 44 starts measuring time (step 82). Since the lens retracting operation is brought to a rapid halt, the voltage of battery 40 rises above UVLO. UVLO detection in UVLO detection circuit 43 resumes (step 83). The number of restarts is incremented (step 84) and time measurement by the UVLO timer is stopped (step 85). Further, whether a DC jack is present or not is determined (step 86). The launch mode of the digital still camera is determined from the time measured by the UVLO timer and whether or not the DC jack is present.

If the digital still camera has a DC jack (this has been stored in the memory 31) ("YES" at step 88), then the camera is set to a DC-jack insertion launch mode (step 89). In the DC-jack insertion launch mode, it is construed in response to UVLO detection that a cord for supplying power from an AC power source has been connected to the jack 47. Operation for retracting the lens is performed slowly until lens retraction processing ends (steps 92, 93). The power-off sequence is then executed (step 94). In the DC-jack insertion launch mode, it is construed that the jack 47 is supplied with power from the AC power source and a display to the effect that there is no battery available is not presented. This makes it possible to prevent the user from being given an erroneous notification, namely the presentation of a display to the effect that there is no battery despite the fact that power is being supplied from the AC power source. Further, in the above-described embodiment, the camera has been set to the DC-jack insertion launch mode based upon whether or not the DC jack 47 is present. However, it may be so arranged that the camera is set to the DC-jack insertion launch mode in response to detection by the mounting detection circuit 48 that the DC jack 47 is being supplied with power from the AC power source. Since the digital still camera is actually being supplied with power from the AC power source, operation is not impeded even if the power source of the digital still camera is turned on.

If the digital still camera does not have a jack ("NO" at step 88) and the time measured by the UVLO timer 44 is equal to or greater than a fixed time ("YES" at step 90), it is construed that the battery 40 of the digital still camera has been replaced with a new battery. As a consequence, the digital still camera is set to a battery insertion/extraction launch mode (step 91). The lens collapsing operation is performed slowly until this operation ends (steps 92, 93). The power-off sequence is then executed (step 94). In the battery insertion/extraction launch mode, it is construed that the battery has been replaced by a new battery and therefore a display to the effect that there is no battery available is not presented. Thus it is possible to prevent the user from being given erroneous notification.

If the digital still camera does not have a DC jack ("NO" at step 88) and the time measured by the UVLO timer 44 is less than the fixed time ("YES" at step 95), then the camera is set to a UVLO-detection launch mode (step 96).

In the above embodiments, a mode determination is carried out based upon existence of DC jack and the measured time of the UVLO timer 44. However, the mode determination may be carried out based upon the existence of DC jack or the measured time.

Figure 6:
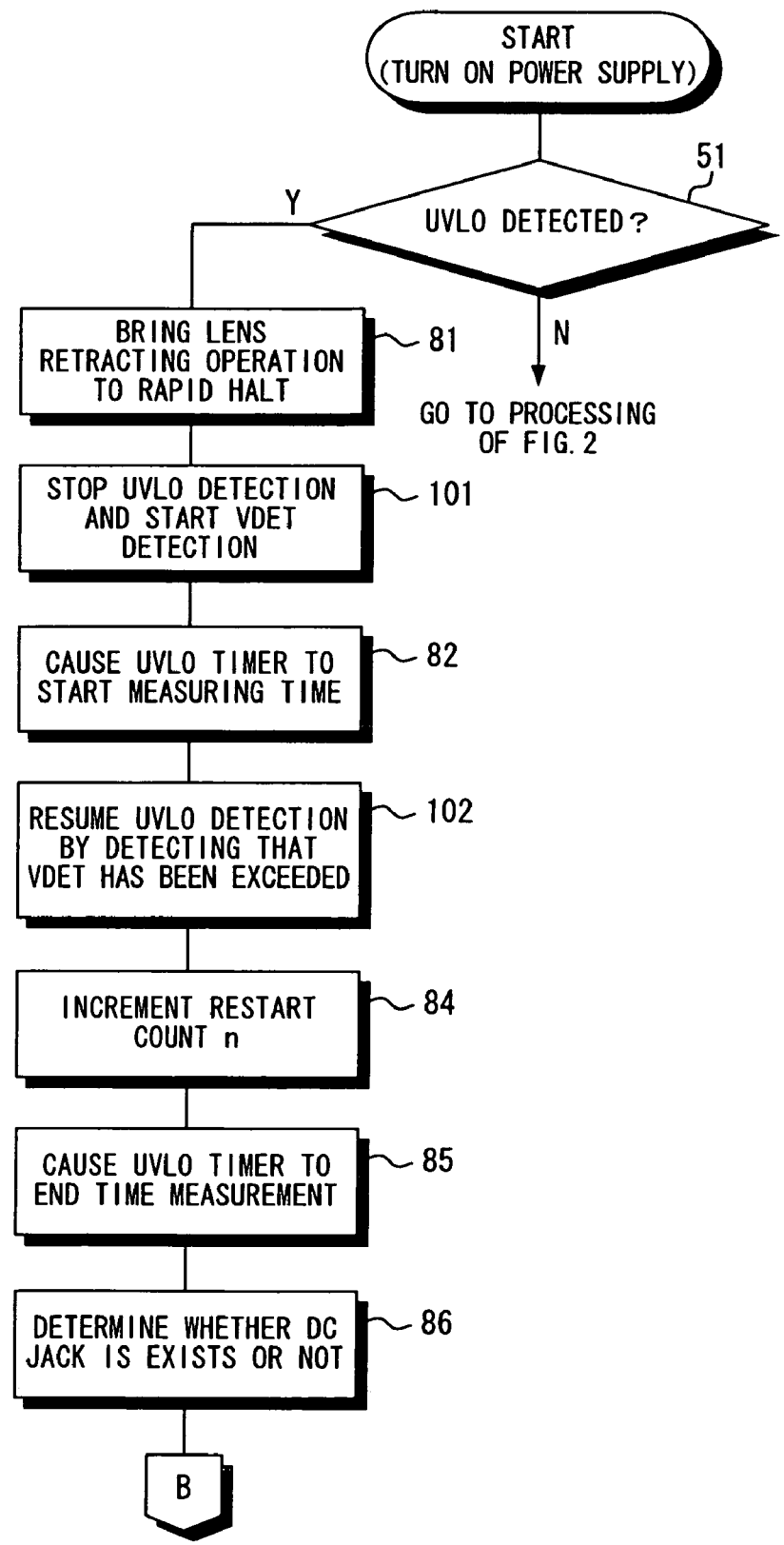
Figure 7:
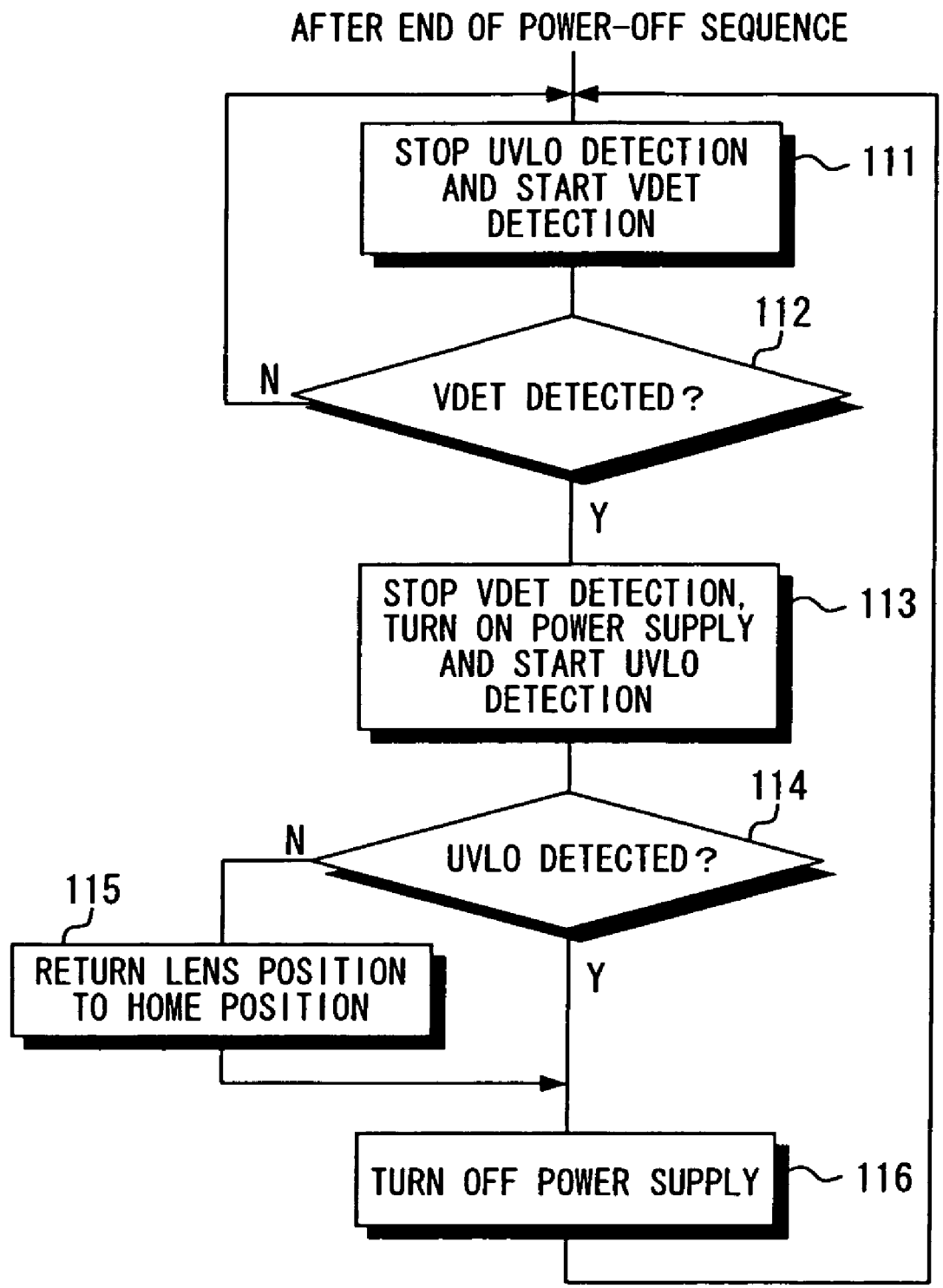

FIGS. 6 and 7 are flowcharts illustrating processing executed by a digital still camera according to yet another embodiment of the present invention. Processing steps in these flowcharts that are identical with those shown in FIGS. 4 and 5 are designated by like step numbers and need not be described again.

In the processing set forth below, UVLO detection processing in the UVLO detection circuit 43 is halted and VDET detection processing in the VDET circuit 42 is executed when the power supply of the digital still camera is turned off. Although the threshold value of UVLO detection processing by the UVLO detection circuit 43 and the threshold value of VDET detection processing are approximately equal, the detection accuracy of the VDET circuit 42 is lower than that of the UVLO detection circuit 43. Consequently, the electric power consumed by the VDET circuit 42 is lower than the electric power consumed by the UVLO detection circuit 43. Thus electric power consumed when the power supply is off can be suppressed.

If UVLO is detected by the UVLO detection circuit 43 in a case where the power supply is on ("YES" at step 51), the lens retracting operation is brought to a rapid halt (step 81). Further, UVLO detection processing in the UVLO detection circuit 43 is stopped and processing for detecting VDET (the second threshold value) in the VDET circuit 42 is started (step 101). Measurement by the UVLO timer 44 starts (step 82) and detection processing in the UVLO detection circuit 43 is resumed in response to detection of the fact that VDET has been exceeded owing to halting of the lens retracting operation (step 102). Processing from this point onward is the same as that shown in FIGS. 4 and 5.

When the power supply of the digital still camera is turned off (this includes a case where the camera is turned off by the power supply button 13 and a case where it is turned off based upon UVLO detection), UVLO detection processing in the UVLO detection circuit 43 stops and VDET detection processing in the VDET circuit 42 starts (step 111). If VDET is detected ("YES" at step 112), VDET detection processing in VDET circuit 42 starts, the power supply of the digital still camera is turned on and UVLO detection processing in the UVLO detection circuit 43 starts (step 113).

If UVLO is detected ("YES" at step 114), the power-off sequence is executed (step 116). If UVLO is not detected, the position of the image sensing lens 1 is checked. If the lens is not at the prescribed position, then it is returned to the prescribed (home) position (i.e., lens collapsing processing is executed at step 115). This is followed by execution of the power-off sequence (step 116). The position of the image sensing lens 1 is checked if the power supply is turned off by the power supply button 13, even if UVLO is not detected, and the lens is returned of the prescribed position if it is not at the prescribed position. If the power-off sequence is executed, processing from step 111 onward is repeated.

Figure 8:
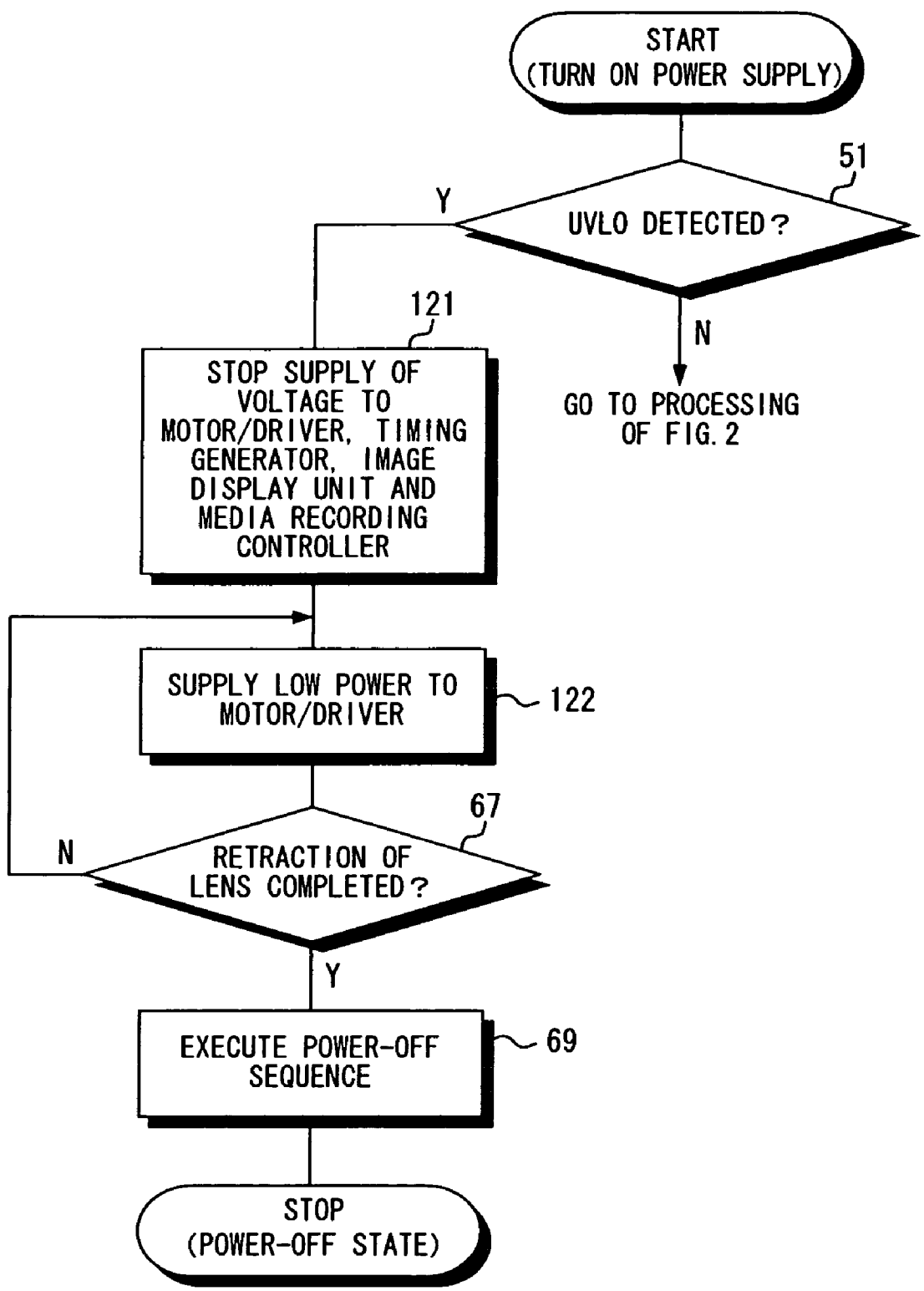

FIG. 8 is a flowchart illustrating part of the processing executed by the digital still camera according to a further embodiment. Processing steps in this flowchart that are identical with those shown in FIG. 2 or 3 are designated by like step numbers and need not be described again.

In the embodiments described above, attention is directed solely to the motor/driver 5 for performing the operation to retract the image sensing lens 1 and no consideration is given to the other circuits. In the embodiment illustrated next, however, circuits other than the motor/driver 5 also are taken into account.

If UVLO is detected ("YES" at step 51), as described above, not only is supply of electric power to the motor/driver 5 for retracting the image sensing lens 1 halted, but supply of electric power to the timing generator 6, image display unit 25 and media recording control circuit 34 is halted as well (step 121). UVLO will have been detected because the image sensing lens 1 has been retracted by the motor/driver 5, and the motor/driver 5 that retracts the image sensing lens 1 will have started this operation immediately before UVLO detection. It goes without saying that the fact that the image sensing lens 1 was being retracted immediately before UVLO detection means that this was being managed by the CPU 8. Electric power lower than the electric power that was being supplied at the time of UVLO detection is supplied to the motor/driver 5, which started operating immediately before UVLO detection (step 122). Supply of power (low power) to the timing generator 6, image display unit 25 and media recording control circuit 34 continues to be halted. Consumed power can be suppressed as a result.

Supply of low power to the motor/driver 5 continues until retraction of the image sensing lens 1 ends. When the image sensing lens 1 is finished being retracted (step 67), the power-off sequence is executed (step 69).

In the embodiment set forth above, it may be so arranged that in a case where a reduction in consumed power need not be taken into consideration, low electric power is supplied not only to the motor/driver 5 but also to the timing generator 6, image display unit 25 and media recording control circuit 34. Further, the timing generator 6, image display unit 25 and media recording control circuit 34 may be supplied not with low electric power but with the electric power that was being supplied at the time of UVLO detection.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for controlling an electronic device, comprising:
    a power supply circuit for supplying each circuit of the electronic device with electric power provided by a battery removably installed in the electronic device;
    a first detection circuit for detecting whether voltage of the battery is less than a first threshold-value voltage, or equal to or greater than the first threshold-value voltage;
    a first power supply control device, which is responsive to detection of a power drop by said first detection circuit indicating that the voltage of the battery is less than the first threshold-value voltage, for controlling said power supply circuit so as to halt supply of electric power to a circuit that was operating when the power drop was detected; and
    a second power supply control device, which is responsive to halting of supply of electric power by said first power supply control device, for controlling said power supply circuit so as to supply the circuit that was operating when the power drop was detected with electric power that is lower than electric power that was being supplied when the power drop was detected.

2. The apparatus according to claim 1, further comprising:
    an operation-completion determination device for determining whether operation has been completed in response to supply of the lower power from said power supply circuit based upon said second power supply control device; and
    a first notification device, which is responsive to a determination by said operation-completion determination device that the operation has been completed, for giving notification of the fact that there is little battery capacity left.

3. The apparatus according to claim 2, further comprising a third power supply control device, which is responsive to the notification by said first notification device, for controlling said power supply circuit so as to turn off the power supply.

4. The apparatus according to claim 2, wherein each circuit of the electronic device can be supplied with electric power applied to an external power supply terminal besides electric power provided from the battery, and said apparatus further comprises:
- a detection device for detecting whether the external power supply terminal exists; and
- a first notification control device, responsive to detection by said detection device that an external power supply terminal exists, for controlling said first notification device so as to halt notification by said first notification device.

5. The apparatus according to claim 2, further comprising:
- a timer for measuring battery voltage drop time extending from halt of supply of power based upon said first power supply control device to start of supply of power based upon said second power supply control device;
- a time determination device for determining whether the battery voltage drop time measured by said timer is equal to or greater than a fixed time;
- a second notification control device, which is responsive to a determination by said time determination device that the battery voltage drop time is equal to or greater than the fixed time, for controlling said first notification device so as to halt the notification by said first notification device.

6. The apparatus according to claim 2, further comprising:
- a repetition count determination device for determining whether control halt of supply of power based upon said first power supply control device and start of supply of lower electric power based upon said second power supply control device have been repeated a prescribed number of times;
- a second notification device, which is responsive to a determination by said repetition count determination device that repetition has been performed the prescribed number of times, for giving notification of the fact that there is little battery capacity left; and
- a fourth power supply control device, which is responsive to notification by said second notification device, for controlling said power supply circuit so as to turn off the power supply.

7. The apparatus according to claim 1, further comprising:
- a second detection circuit, which operates in response to the power supply of the electronic device being turned off and consumes less electric power than said first detection circuit, for detecting whether the voltage of the battery has become smaller than a second threshold value;
- a first detection halting device for halting detection operation by said first detection circuit in response to the power supply of the electronic device being turned off; and
- a detection-circuit control device, which is responsive to detection by said second detection circuit that the voltage of the battery is less than the second threshold value, for controlling said first detection circuit and said second detection circuit so as to halt the detection operation by said second detection circuit and start the detection operation by said first detection circuit.

8. The apparatus according to claim 1, wherein if a plurality of circuits were operating when the power drop was detected, said first power supply control device halts supply of electronic power to the plurality of circuits that were operating; and
said second power supply control device supplies electric power that is lower than the electric power that was being supplied at detection of the power drop to that circuit which started operating immediately before detection of the power drop among the plurality of circuits whose operation was halted by said operation halting control device.

9. A method of controlling an electronic device having a power supply circuit for supplying each circuit of the electronic device with power provided by a removably installed battery, said method comprising the steps of:
- detecting whether voltage of the battery is less than a first threshold-value voltage, or equal to or greater than the first threshold-value voltage;
- in response to detection of a power drop indicating that the voltage of the battery is less than the first threshold-value voltage, halting supply of electric power to a circuit that was operating when the power drop was detected; and
- in response to halting of supply of electric power, supplying electric power to the circuit that was operating when the power drop was detected with electric power that is lower than power that was being supplied when the power drop was detected.

* * * * *